(12) United States Patent
Wiese (10) Patent No.: US 7,823,527 B1
(45) Date of Patent: *Nov. 2, 2010

(54) TELESCOPING FLAGPOLE

(76) Inventor: Michael J. Wiese, 26835 Oak Ridge Way, Elko, MN (US) 55020

( * ) Notice: Subject to any disclaimer, the term of this patent is extended or adjusted under 35 U.S.C. 154(b) by 42 days.

This patent is subject to a terminal disclaimer.

(21) Appl. No.: 12/004,633

(22) Filed: Dec. 24, 2007

Related U.S. Application Data (63) Continuation-in-part of application No. 11/235,903, filed on Sep. 27, 2005, now Pat. No. 7,311,061, which is a continuation of application No. 10/688,620, filed on Oct. 17, 2003, now Pat. No. 6,951,185.

(51) Int. Cl.
*G09F 17/00* (2006.01)
*F16B 7/10* (2006.01)

(52) U.S. Cl. .................... 116/173; 403/109.2; 403/349

(58) Field of Classification Search ............... 116/173, 116/174, 28 R; 248/125.8, 161, 404, 407; 40/607.04; 403/109.1, 109.2, 109.3, 109.5, 403/109.8, 348, 349, 350, 377
See application file for complete search history.

(56) References Cited

U.S. PATENT DOCUMENTS

| | | | |
|---|---|---|---|
| 811,209 A | 1/1906 | Farrell | |
| 859,233 A | 7/1907 | Lane | |
| 918,579 A | 4/1909 | Murch | |
| 993,121 A | 5/1911 | Stone et al. | |
| 1,288,060 A | 12/1918 | Le Duc | |
| 2,483,396 A | 10/1949 | Benson | |
| 2,601,088 A | 6/1952 | Burgess | |
| 2,947,557 A | 8/1960 | Schwab et al. | |
| 2,989,329 A | 6/1961 | Noah | |
| 3,153,252 A | 10/1964 | Ricciardi | |
| 3,423,781 A | 1/1969 | Henson | |
| 3,474,833 A | 10/1969 | Garrette, Jr. et al. | |
| RE26,779 E | 2/1970 | Weichenrieder | |
| 3,596,946 A | 8/1971 | Burton et al. | |
| 3,675,615 A | 7/1972 | Stangarone et al. | |
| 3,738,075 A | 6/1973 | Nansel | |
| 4,079,555 A | 3/1978 | Barnes | |
| 4,299,421 A | 11/1981 | Bontrager | |
| 4,406,097 A | 9/1983 | Meston | |
| 4,464,078 A | 8/1984 | Vorobyov | |
| 4,518,162 A | 5/1985 | Oates | |
| 4,800,834 A | 1/1989 | Feng | |
| 4,918,896 A | 4/1990 | Wiese | |
| 5,343,825 A | 9/1994 | Gazecimeon et al. | |
| 5,485,700 A | 1/1996 | Van Vranken | |
| 5,540,017 A | 7/1996 | Eliam et al. | |
| 5,572,835 A | 11/1996 | Atkins et al. | |
| 5,741,084 A | 4/1998 | Del Rio et al. | |
| 6,003,724 A * | 12/1999 | Collins et al. | ............... 221/154 |

(Continued)

*Primary Examiner*—R. A. Smith
(74) *Attorney, Agent, or Firm*—Jeffrey A. Proehl; Woods, Fuller, Schultz & Smith, PC (57) ABSTRACT

A telescopic flagpole for reducing the manual force required to extend and secure multiple segments. The flagpole includes a plurality of segments including a bottom segment, at least one intermediate segment, and a top segment; a plurality of sleeve assemblies each positioned between an associated pairing of a relatively lower segment and a relatively higher segment; and a plurality of biasing members each urging an associate one of the segments toward an extended position.

21 Claims, 12 Drawing Sheets

U.S. PATENT DOCUMENTS

| | | |
|---|---|---|
| 6,287,042 B1 | 9/2001 | Eriksson |
| 6,343,568 B1 | 2/2002 | McClasky |
| 6,494,636 B1 | 12/2002 | Mozena |
| 6,595,226 B2 | 7/2003 | Uemura |
| 6,695,266 B1 | 2/2004 | Tsai |
| 6,951,185 B1 | 10/2005 | Wiese |
| 7,243,953 B2 * | 7/2007 | Nakamura et al. ............ 285/82 |
| 2002/0037192 A1 | 3/2002 | Eriksson |
| 2002/0141812 A1 | 10/2002 | Edelen et al. |
| 2006/0081739 A1 | 4/2006 | Meissner |

* cited by examiner

TELESCOPING FLAGPOLE

CROSS REFERENCE TO RELATED APPLICATIONS

This application is a continuation-in-part of application Ser. No. 11/235,903, filed Sep. 27, 2005 now U.S. Pat. No. 7,311,061, which is a continuation of application Ser. No. 10/688,620, filed Oct. 17, 2003 and issued as U.S. Pat. No. 6,951,185 on Oct. 4, 2005, both of which are incorporated by reference herein in their totalities.

BACKGROUND OF THE INVENTION

1. Field of the Invention

The present invention relates to telescopic flagpoles and more particularly pertains to a new flag pole for providing enhanced access to a flag being displayed and improved manual extension and retraction capabilities.

2. Description of the Prior Art

The use of flagpoles is known in the prior art. Illustrative examples of such devices include: U.S. Pat. No. 4,406,097; U.S. Pat. No. 5,540,017; U.S. Pat. No. 5,572,835; U.S. Pat. No. 4,918,896; U.S. Pat. No. 859,233; U.S. Pat. No. 5,485,700; U.S. Pat. No. 6,287,042; U.S. Pat. No. 4,079,555; U.S. Pat. No. 4,464,078; U.S. Pat. No. 3,675,615; U.S. Patent Application: 2002/0037192.

While these devices fulfill their respective, particular objectives and requirements, the need remains for a assembly which requires reduced manual force to extend and secure multiple segments in a telescoping arrangement.

SUMMARY OF THE INVENTION

The basic configuration of a telescopic flagpole in general and a lanyard-free telescopic flag pole in particular have been described thoroughly in the specification of U.S. Pat. No. 4,918,896 issued to Harold Wiese. The specification of the U.S. Pat. No. 4,918,896 is hereby and herewith incorporated by reference into this disclosure.

The present invention overcomes a limitation of the prior designs, specifically the force necessary to lift the various segments into position. As the number of intermediate segments in the telescopic flagpole increase, and/or the overall span of the segments increases, it becomes increasingly difficult to manually lift the segments into position. Additionally, securing the segments in an extended position also becomes more difficult. The present invention provides a series of biasing means to assist in positioning the segments into their extended position. Further, the present invention provides a locking system which aides in the retention of the segments in their extending positions. Finally, by implementing a twist to engage/disengage structure in the locking system, the manual extension and securing of the telescopic flagpole is significantly enhanced.

To this end, the present invention generally comprises a plurality of segments including a bottom segment, at least one intermediate segment, and a top segment; a plurality of sleeve assemblies each positioned between an associated pairing of a relatively lower segment and a relatively higher segment; and a plurality of biasing means each urging an associate one of the segments toward an extended position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 12 thereof, a new flag pole embodying the principles and concepts of the present invention and generally designated by the reference numeral 10 will be described.

As best illustrated in FIGS. 1 through 7, the flag pole 10 generally comprises a plurality of segments 20, a plurality of sleeve assemblies 30, and a plurality of biasing means 40.

Figure 1:
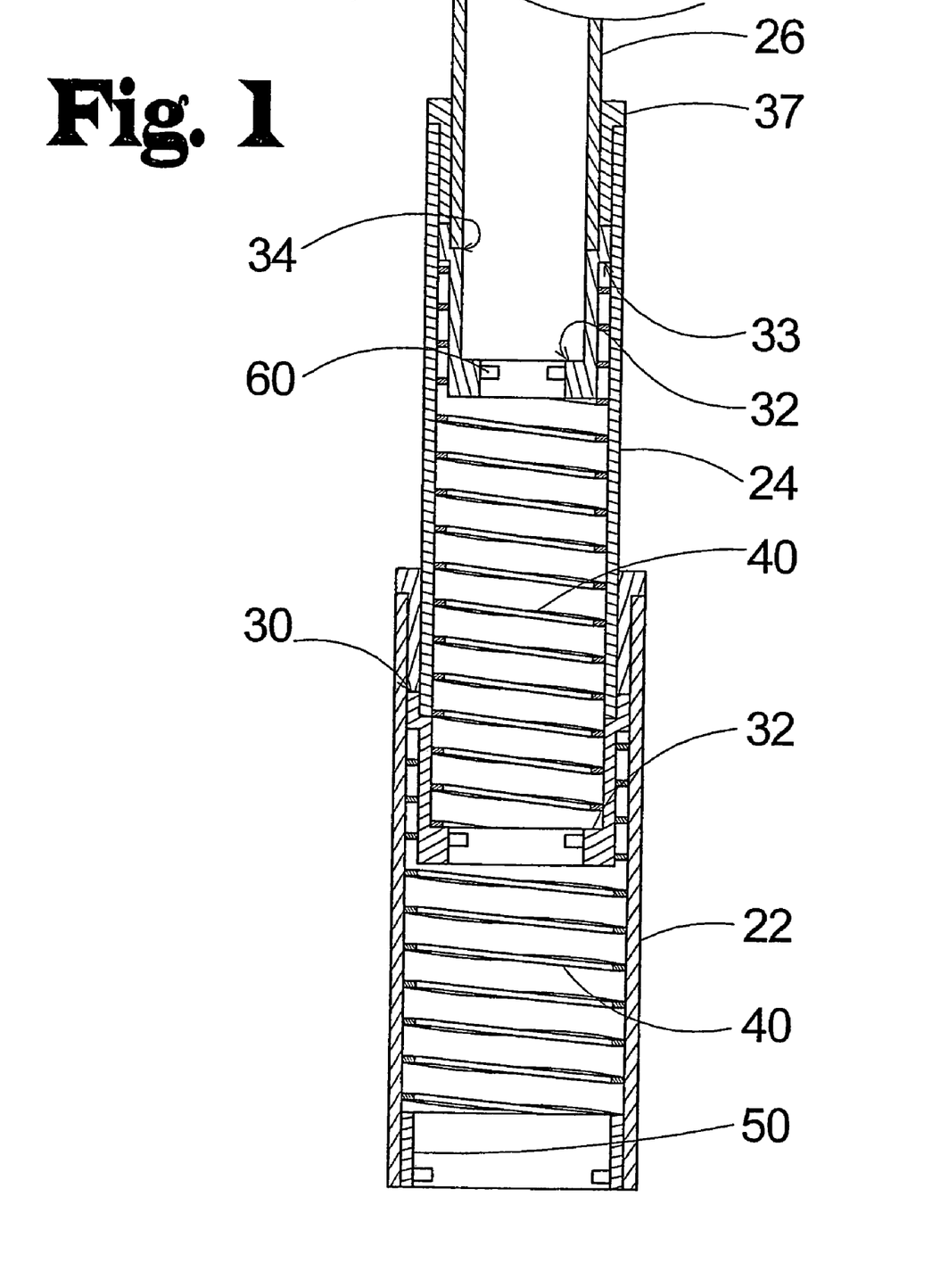
FIG. 1 is a schematic partial cross-sectional view of a new flag pole in an extended position according to the present invention.
Figure 2:
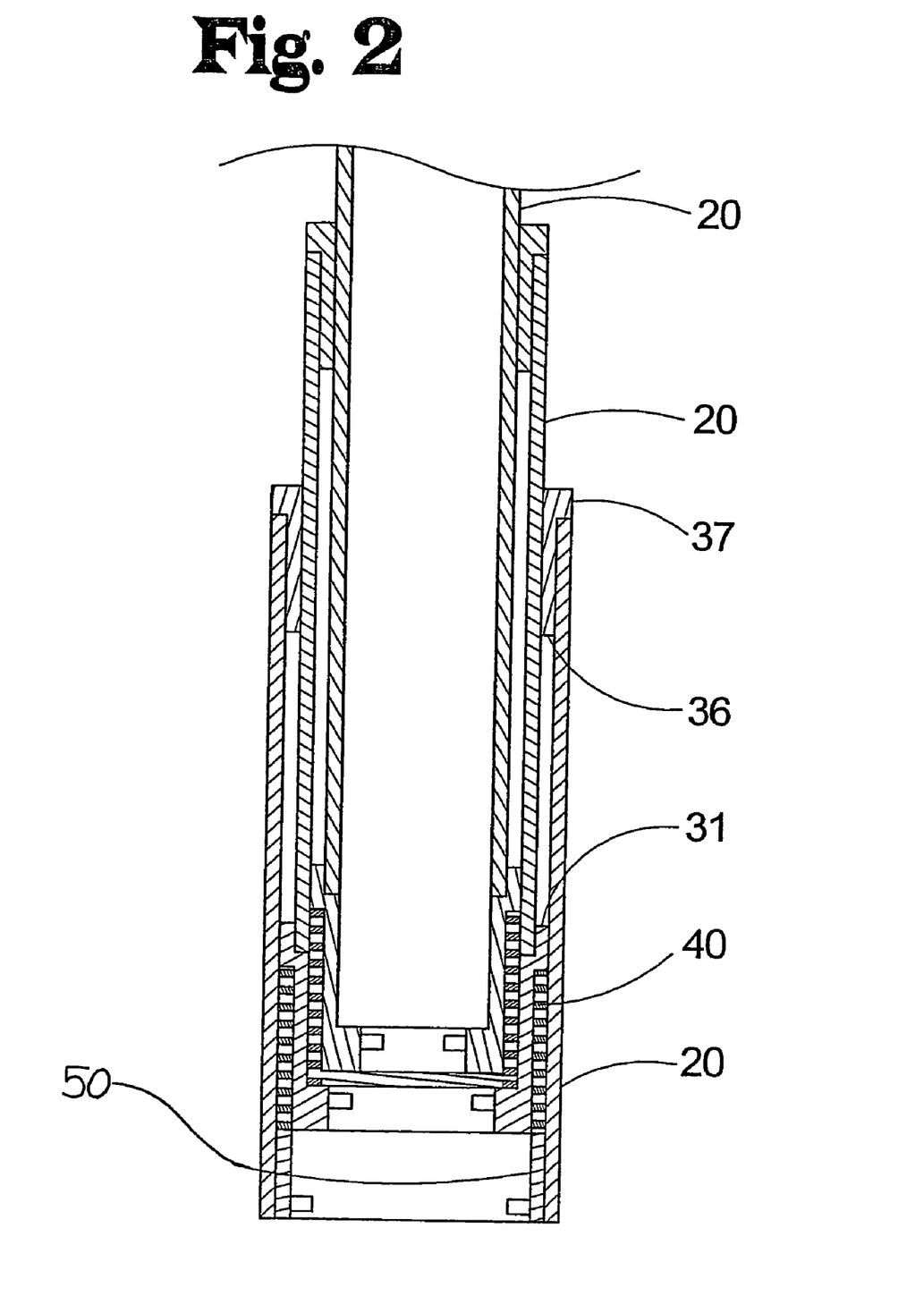
FIG. 2 is a schematic partial cross-sectional view of the present invention in a retracted position.
Figure 3:
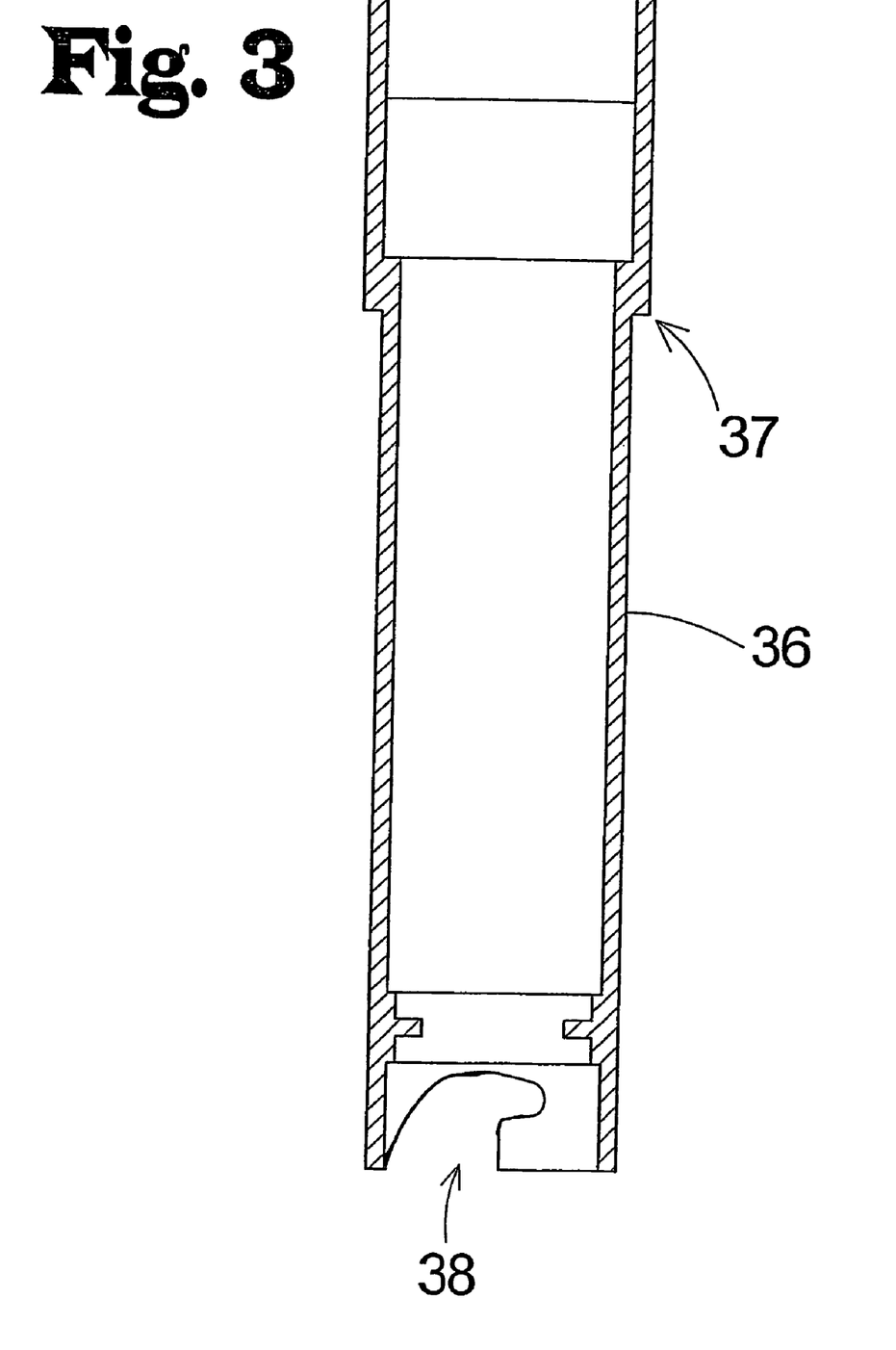
FIG. 3 is a schematic cross-sectional view of an upper sleeve member of the present invention taken along line 3-3 of FIG. 6.

Preferably, the plurality of segments 20 includes a bottom segment 22, at least one intermediate segment 24, and a top segment 26. Each of the segments 20 comprises a rigid elongate cylindrical tube of a size to fit telescopically within the next adjacent lower tube.

A similar configuration is also contemplated using only a top segment 26, bottom segment 22, one sleeve assembly 30 and one biasing means 40.

The plurality of sleeve assemblies 30 facilitate telescopic movement of adjacent tubes. Each one of the sleeve assemblies 30 is positioned between an associated pairing of a relatively lower segment and a relatively higher segment.

Each one of the plurality of biasing means 40 urges an associate one of the segments 20 toward an extended position.

Most preferably, each one of the plurality of sleeve assemblies 30 further comprises an upper sleeve member 36 and a lower sleeve member 31. The upper sleeve member 36 is positionable to abut a top edge of the relatively lower one of the segments 20. The lower sleeve member 31 is positionable to abut a lower edge of the relatively higher one of the segments 20.

In a preferred embodiment, the lower sleeve member 31 further includes a lower stop portion 32, an upper stop portion 33, and a ledge portion 34. The lower stop portion 32 engages a bottom portion of an associated one of the biasing means 40 associated with the relatively higher segment. The upper stop portion 33 engages a top portion of an associated one of the biasing means 40 associated with the relatively lower segment. The ledge portion 34 is used for engaging a bottom edge of the relatively higher segment.

In a further embodiment, the upper sleeve member 36 includes a lip portion 37. The lip portion 37 abuts a top edge of the relatively lower segment.

Preferably, the upper sleeve member 36 selectively engages the lower sleeve member 31. Thus, the lower sleeve member 31 is maintained in a static position relative to the upper sleeve member 36. As the ledge portion 34 of the lower segment engages the bottom of a relatively higher segment, securing the lower sleeve member 31 to the upper sleeve member 36 secures the relatively higher segment in an extended position.

Most preferably, the upper sleeve member 36 includes a locking slot portion 38 positioned in a lower portion of its perimeter wall, and the lower sleeve member 31 includes a locking tab portion 35 extending from an upper portion of its perimeter wall. The locking tab portion 35 slideably engages the locking slot portion 38. Thus, rotating the upper sleeve member 36 with respect to the lower sleeve member 31 in a first direction engages the locking tab 35 into the locking slot 38 and rotating the upper sleeve member 36 with respect to the lower sleeve member 31 in a second direction disengages the locking tab 35 from the locking slot 38.

The biasing means 40 is preferably a spring member. In at least one embodiment, the spring member has a compressed overall length of approximately 9 inches, and an extended overall length of approximately 90 inches.

Figure 5:
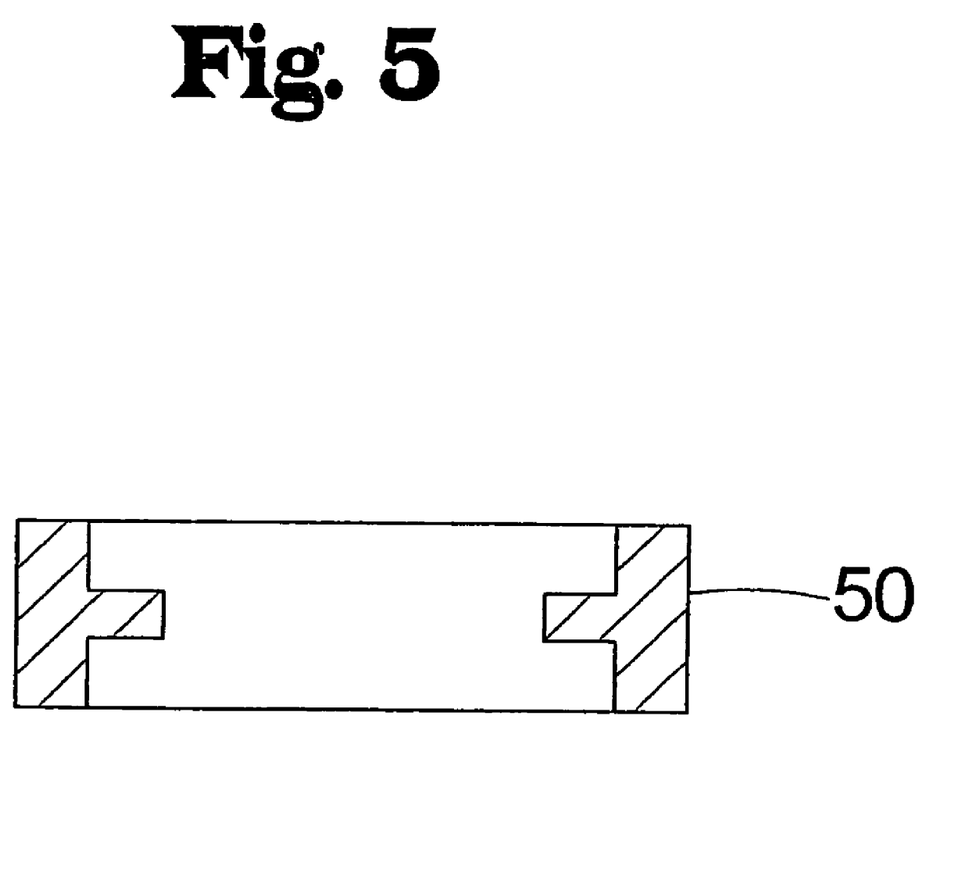
FIG. 5 is a schematic top view of a stop ring member of the present invention.

A stop ring member 50 may be positioned in a bottom portion of the bottom segment 22. The stop ring member 50 engages a bottom portion of a first one of the plurality of biasing means 40.

The assembly 10 may also include a plurality of retaining means 60. Each one of the plurality of retaining means 60 is associated with one of the segments 20 for selectively securing the segment 20 in a non-extended position.

In use, the desired height of the extended flagpole assembly will be determinative of the number of segments used, the length of each segment, and the diameter of each segment. As an illustrative example only, and not for purposes of limitation, the following table presents the configuration of three lengths of flagpoles contemplated by the present invention.

| Total Length | Depth into Ground | # of Segments | # of Biasing Means | Outer diameter of Segments (Inches) Segment # | | | | | |
|---|---|---|---|---|---|---|---|---|---|
| | | | | 1 | 2 | 3 | 4 | 5 | 6 |
| 20 Feet | 14" | 4 | 3 | 2.25 | 2.00 | 1.75 | 1.50 | — | — |
| 25 Feet | 16" | 5 | 4 | 2.50 | 2.25 | 2.00 | 1.75 | 1.50 | — |
| 30 Feet | 18" | 6 | 5 | 2.75 | 2.50 | 2.25 | 2.00 | 1.75 | 1.50 |

Once the flagpole has been installed, the user couples the flag to be displayed to the top segment. The user then raises the top segment to its fully extended position and rotates the top segment until the locking tab portion of the first lower sleeve member engages the locking slot portion of the first upper sleeve member.

The user then raises and secures each subsequent segment in a similar manner. To lower the flag pole, the process is simply reversed.

Figure 8:
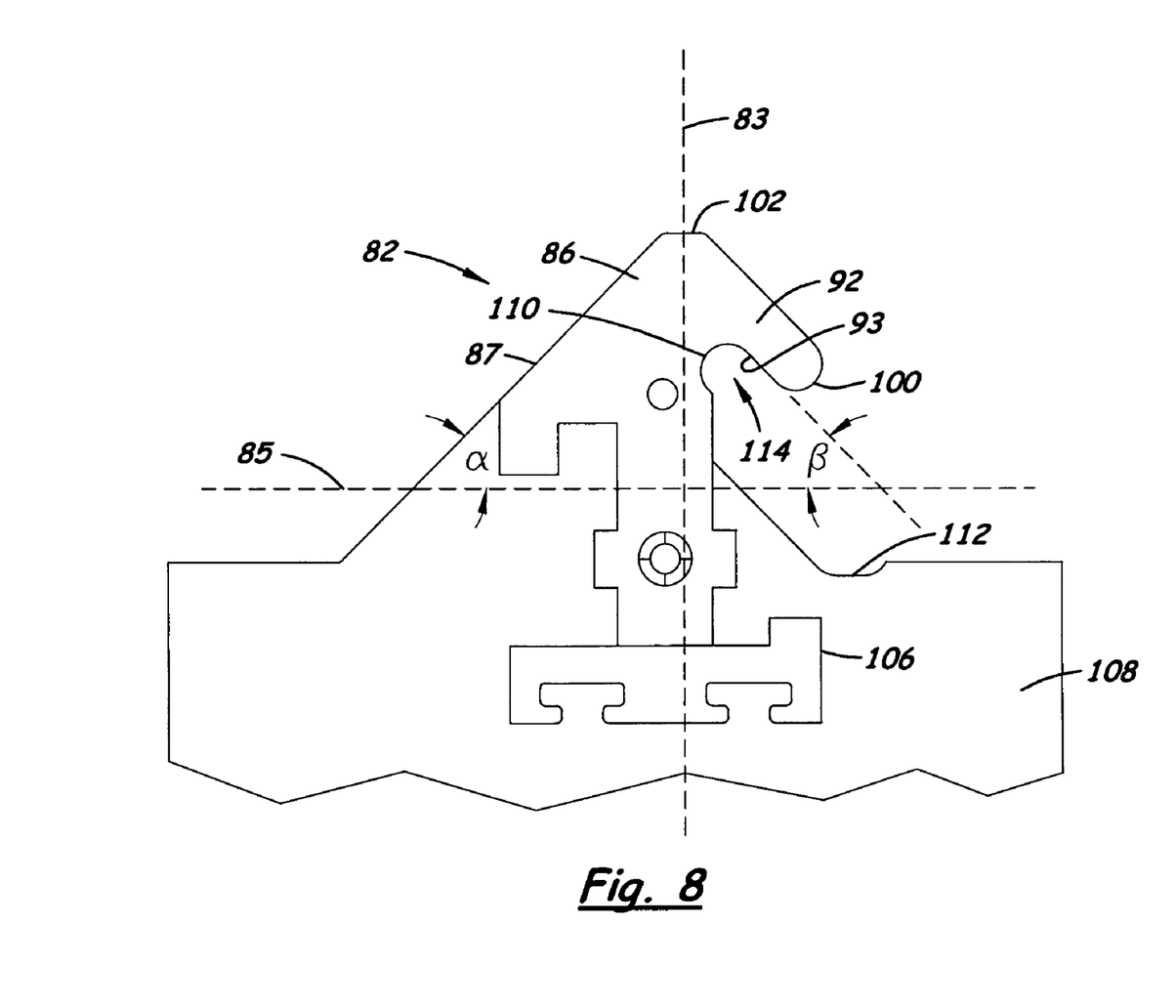
FIG. 8 is a schematic side view of a configuration of the perimeter wall of the lower sleeve member of the present invention.
Figure 9:
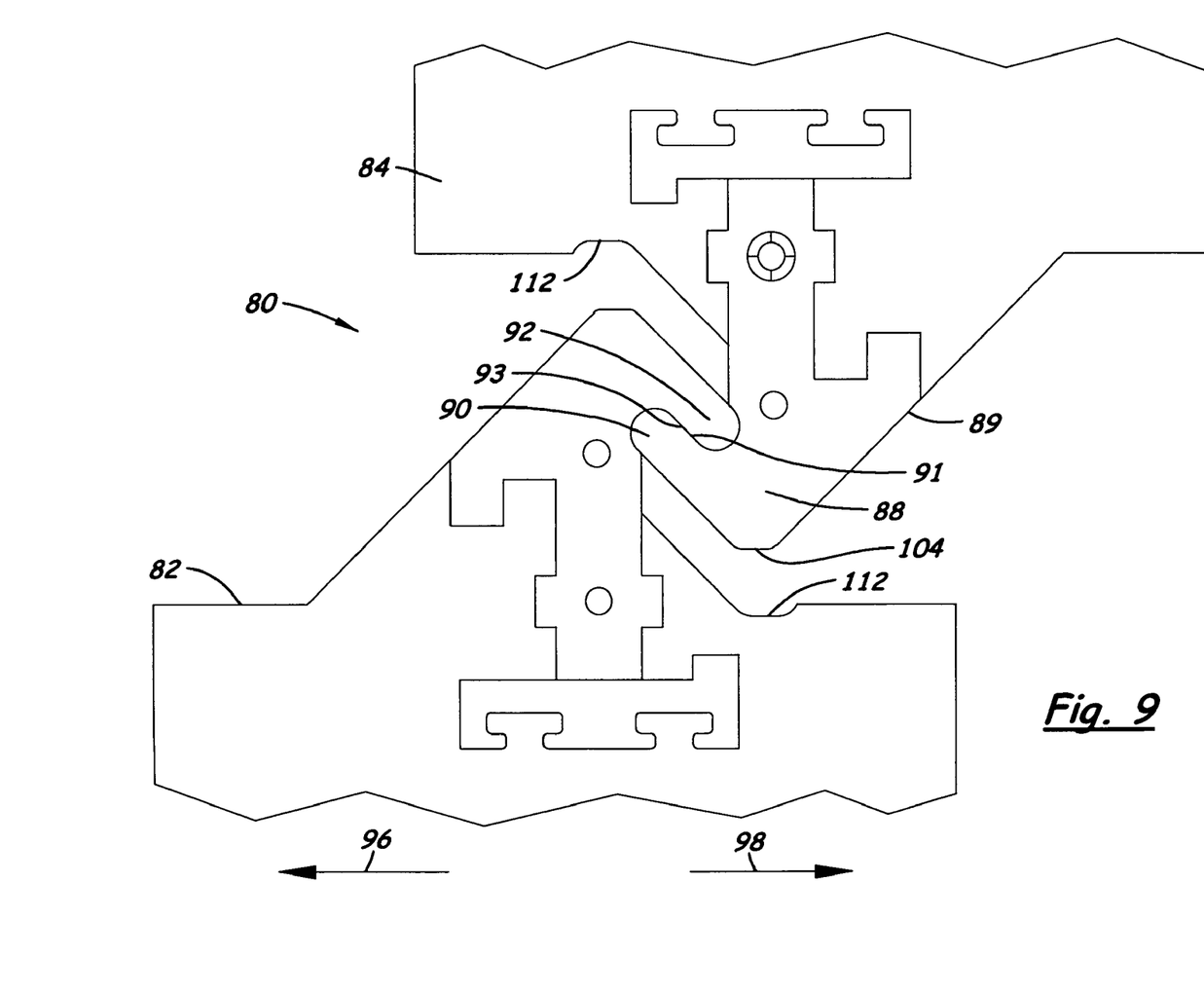
FIG. 9 is a schematic side view of a configuration of the perimeter wall of a lower sleeve member and an upper sleeve member of a sleeve assembly of the present invention.
Figure 10:
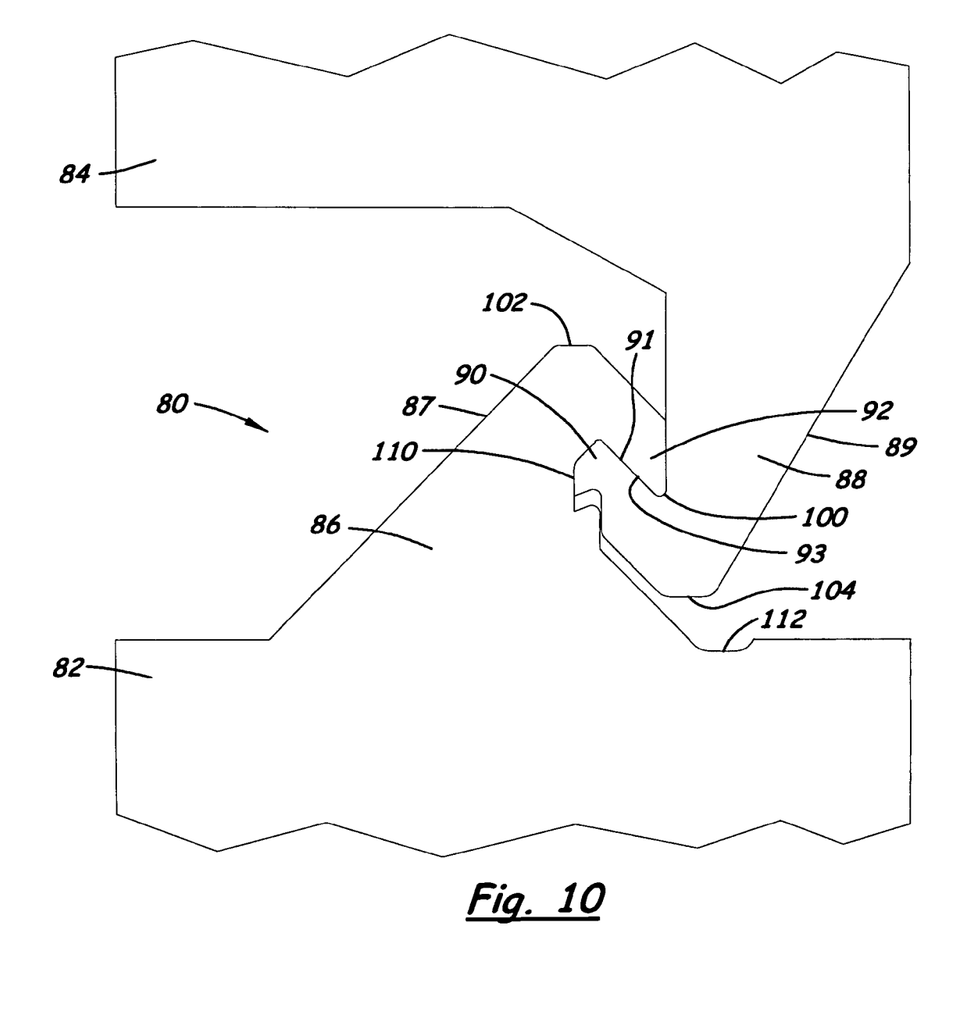
FIG. 10 is a schematic side view of another configuration of the perimeter wall of a lower sleeve member and an upper sleeve member of a sleeve assembly of the present invention.
Figure 11:
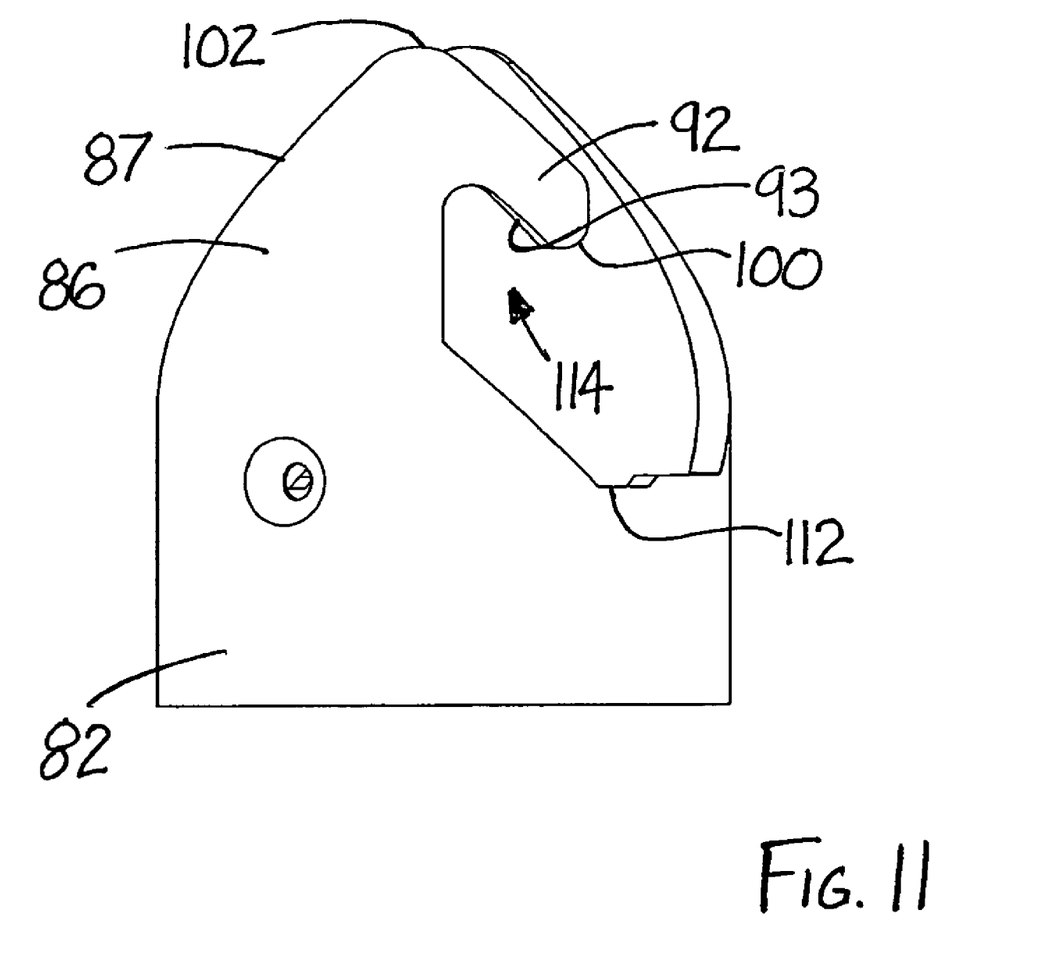
FIG. 11 is a schematic perspective view of a lower sleeve member of the invention.
Figure 12:
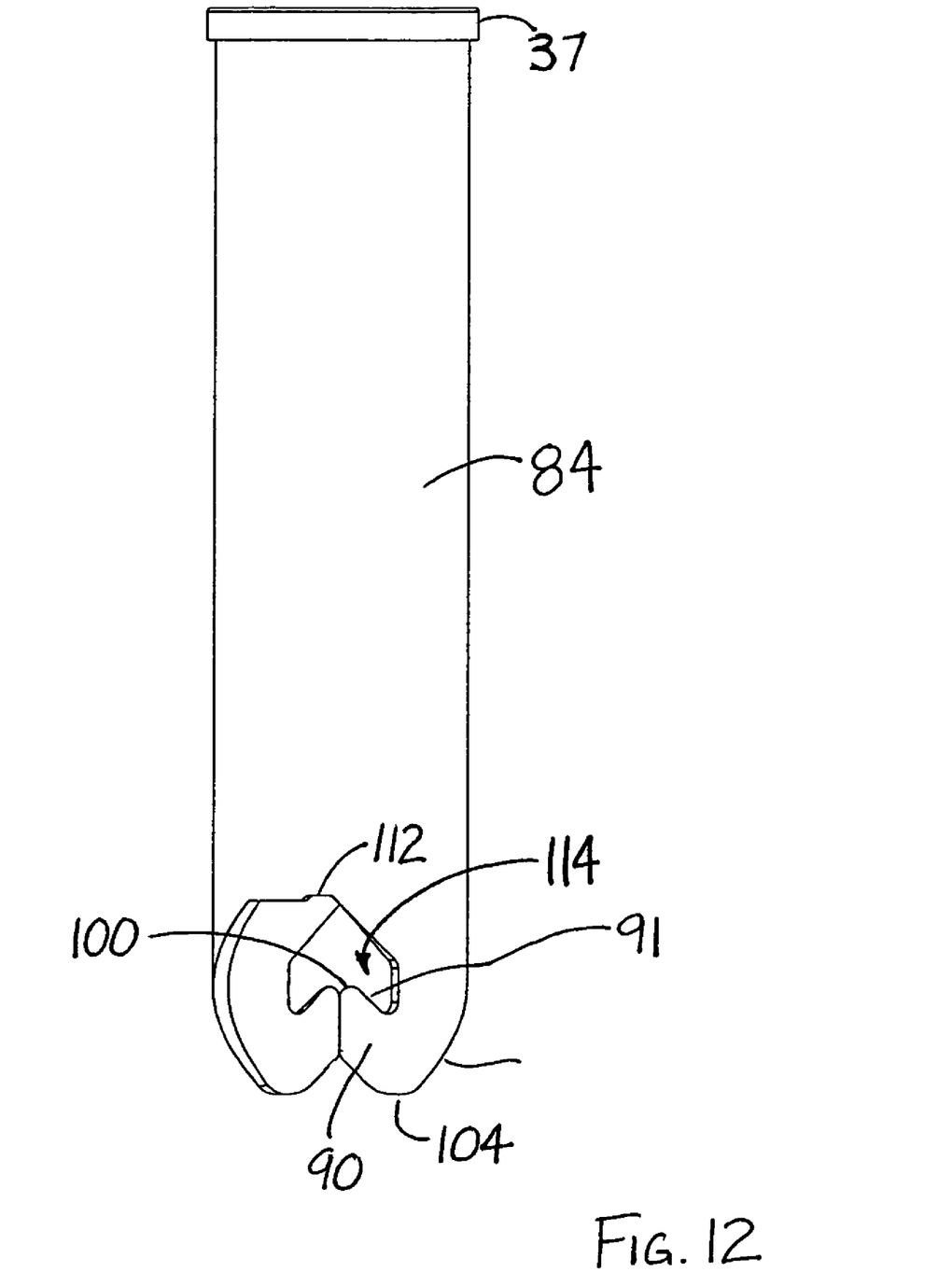
FIG. 12 is a schematic perspective view of an upper sleeve member of the invention.

Looking to FIGS. 8 through 10 of the drawings, various optional features of the invention are disclosed. Looking first to FIG. 8, a portion of the sleeve assembly 80 is shown with a portion of the lower sleeve member 82 and a portion of the upper sleeve member 84. The lower sleeve member 82 may have a central longitudinal axis 83, and a reference plane 85 may extend substantially perpendicular to the central longitudinal axis 83.

Figure 4:
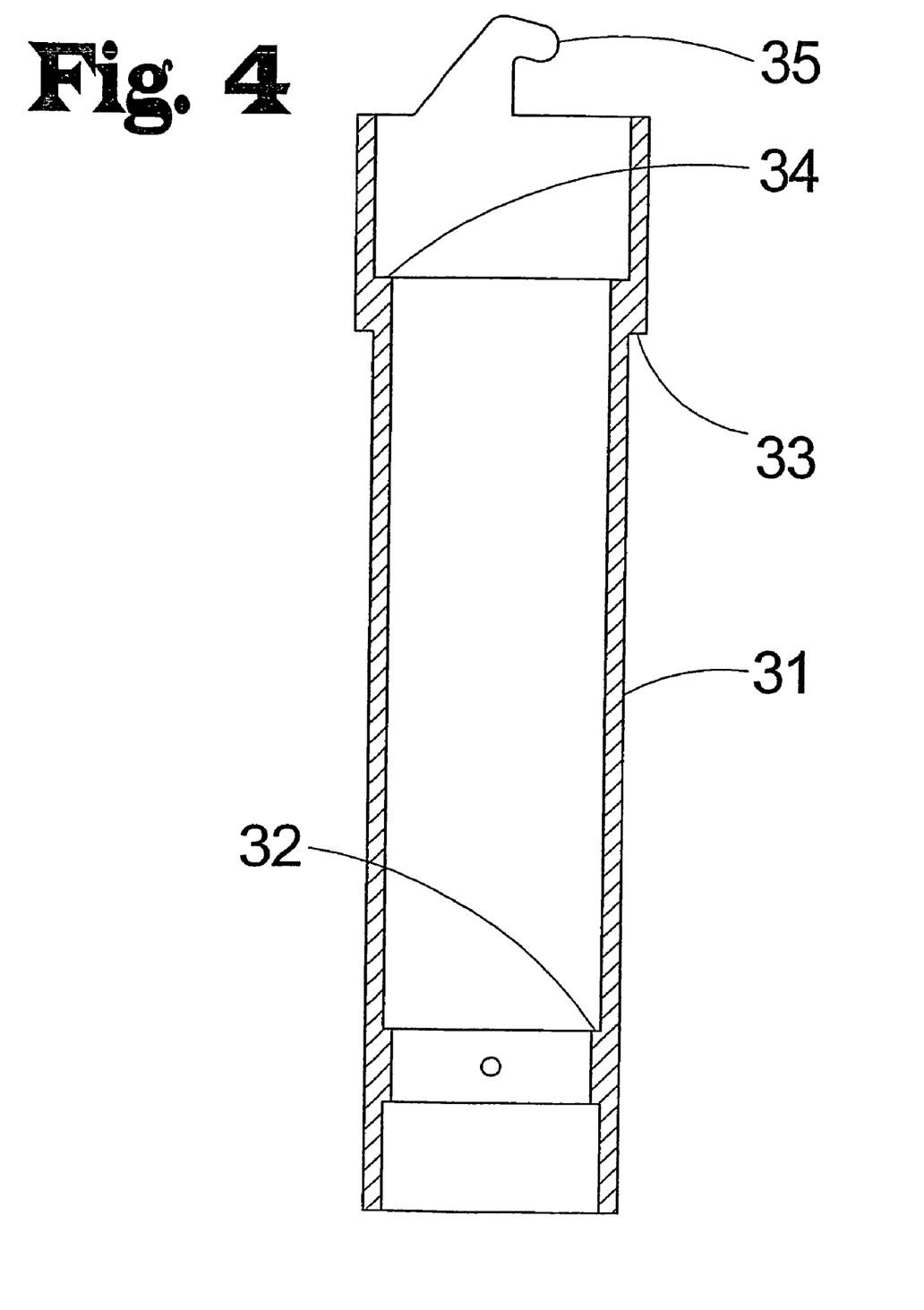
FIG. 4 is a schematic cross-sectional view of a lower sleeve member of the present invention taken along line 4-4 of FIG. 6.
Figure 6:
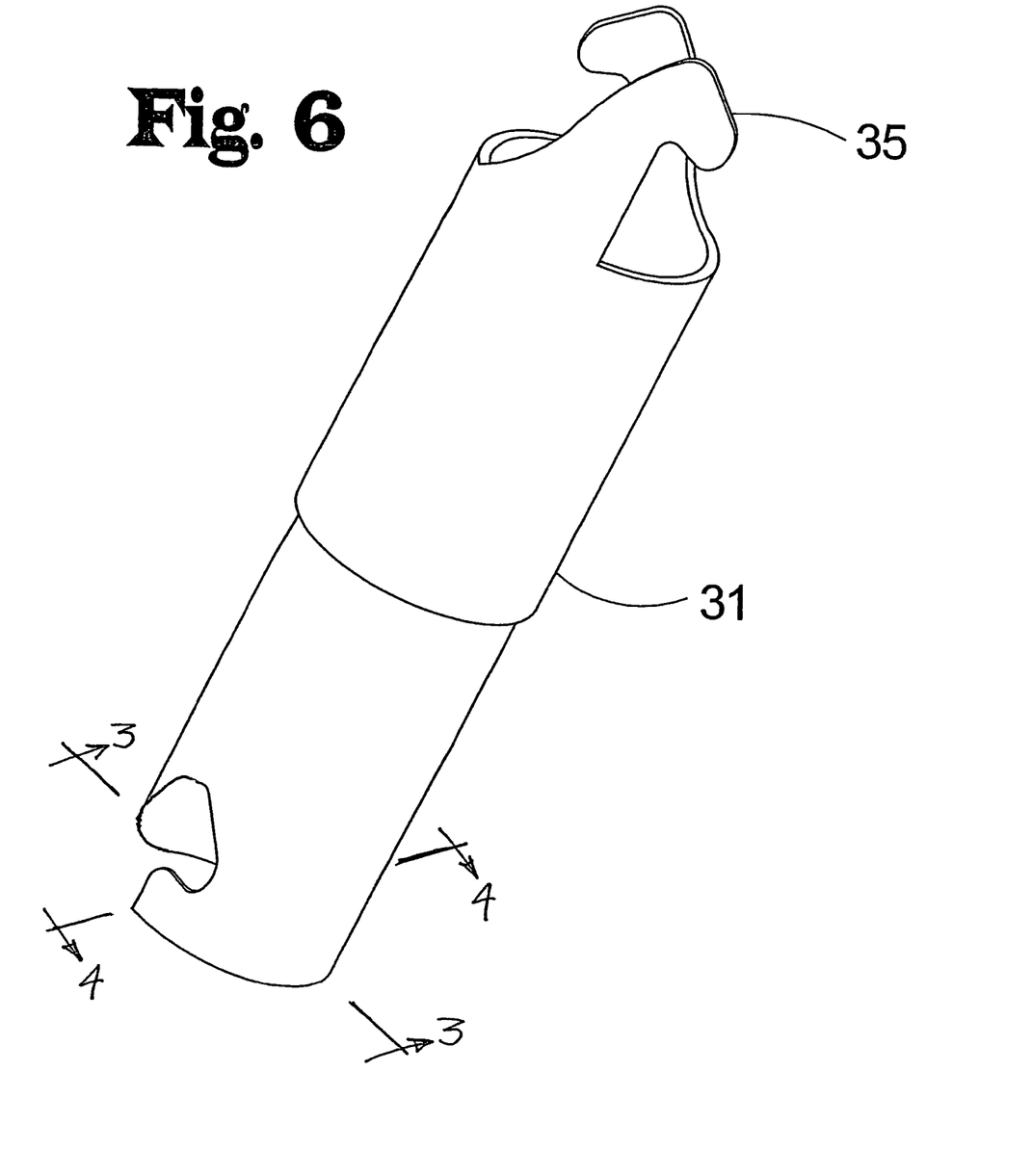
FIG. 6 is a schematic perspective view of the upper sleeve member of the present invention.
Figure 7:
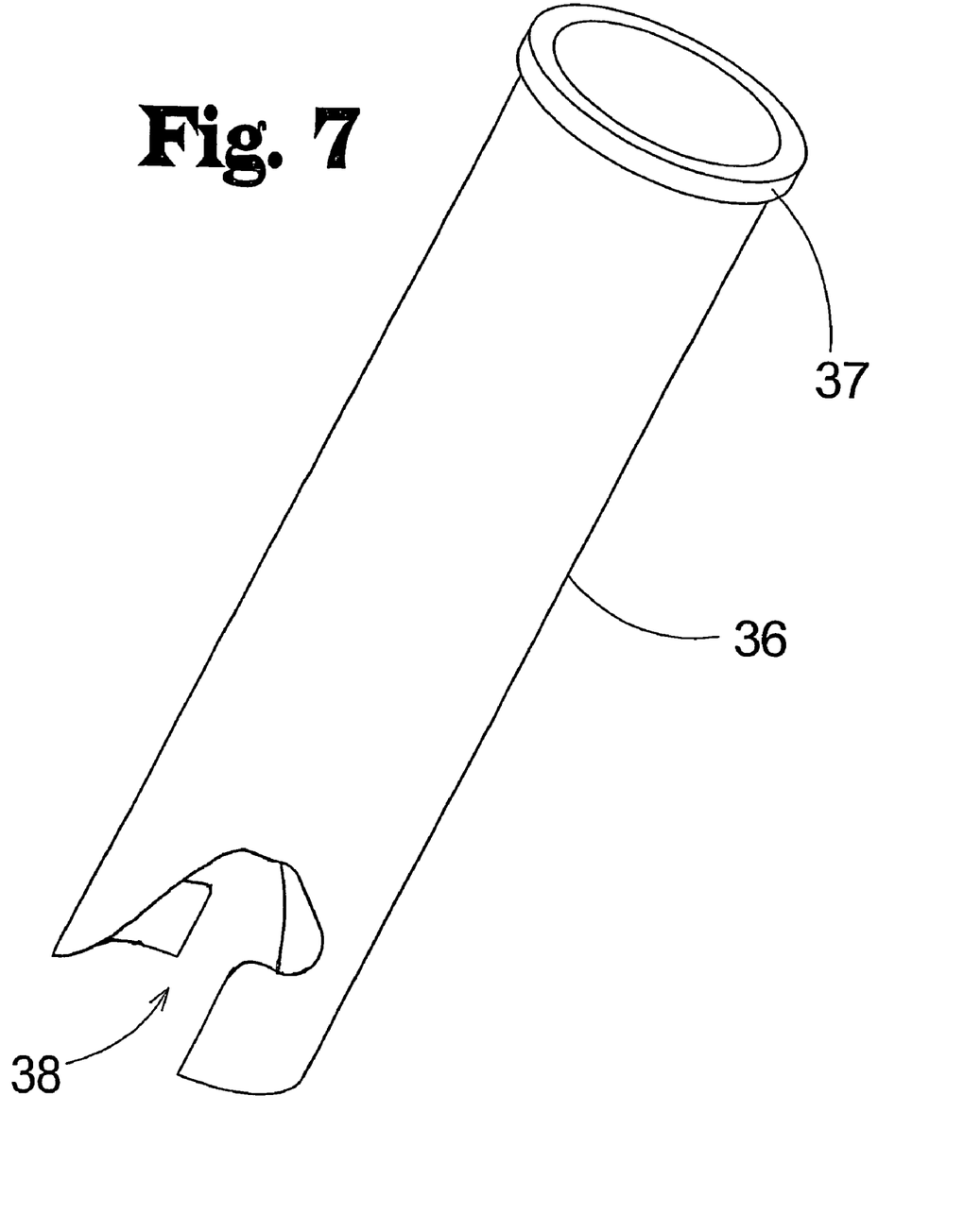
FIG. 7 is a schematic perspective view of an embodiment of the lower sleeve member of the present invention.

A portion of the perimeter wall of the lower sleeve member 82 extending upwardly forms a locking tab 86, and a portion of the perimeter wall of the upper sleeve member 84 extending downwardly forms a locking slot 88. The locking tab 86 may have a tab edge 87 that may be inclined with respect to the reference plane 85 (as shown in FIGS. 4, 6 and 8), and the locking slot 88 may have a slot edge 89 that may also be inclined with respect to the reference plane 85 (as shown in FIGS. 7 and 8). The angle α of inclination of the edges 87, 89 with respect to the reference plane may be in the range of approximately 15 degrees to approximately 75 degrees, and may be more suitable in the range of approximately 30 degrees to approximately 60 degrees, with an illustrative embodiments of the assembly 80 having inclinations of the edges 87, 89 of approximately 45 degrees. Significantly, the inclined tab edge 87 and the inclined slot edge 89 may abut and slidingly contact each other by rotating one of the sleeve members with respect to the other of the sleeve members, and this rotation may tend to guide the tab 86 toward the slot 88 when the edges 87, 98 contact each other, which thereby facilitates the engagement of the tab with the slot by the user when the lower sleeve member 82 (and the relatively upper segment to which the sleeve member 82 is connected) is raised with respect to the upper sleeve member 84).

In some embodiments, the inclined tab edge 87 may be curved (see FIGS. 4 and 6), and in some embodiments the inclined tab edge 87 may be substantially straight (see FIG. 8). In some embodiments, the inclined tab edge 87 may be curved (see FIGS. 4 and 6), and in some embodiments the inclined tab edge 87 may be substantially straight (see FIG. 8).

In some embodiments, the perimeter wall of the upper sleeve member 84 may define a first finger 90 and the perimeter wall of the lower sleeve member 82 may define a second finger 92. The first finger 90 of the upper sleeve member may form a hook that opens upwardly, and the second finger 92 of the lower sleeve member may form a hook that opens downwardly.

The first finger 90 may include a first contact edge 91 and the second finger 92 may include a second contact edge 93. The contact edges 91, 93 of the respective fingers 90, 92 may contact when the fingers are engaged with each other and the relatively upper segment is held in an extended position with respect to the relatively lower segment. The contact edges 91, 93 of the respective first 90 and second 92 fingers may be inclined with respect to the reference plane 85. In some of the more preferred embodiments, the contact edges 91, 93 are inclined at similar or the same angles with respect to the reference plane 85, although this is not critical to the invention. Further, the angle β of inclination of the contact edges 91, 93 with respect to the reference plane may be in the range of approximately 15 degrees to approximately 75 degrees, and may be more suitable in the range of approximately 30 degrees to approximately 60 degrees, with an illustrative embodiments of the assembly 80 having inclinations of the edges 87, 89 of approximately 45 degrees.

Significantly, when the lower sleeve member 82 (mounted on the relatively upper segment) is engaged or interlocked with the upper sleeve member 84, rotation of the lower sleeve member 82 (such as by rotating the relatively upper segment to which the lower sleeve member is connected) with respect to the upper sleeve member 84 (and the relatively lower segment to which the member 84 is connected) causes the contact edges 91, 93 of the respective upper and lower sleeve members to slide against each other, and the inclined orientation of the contact edges causes the lower sleeve member (and the relatively upper segment) to raise slightly. The lower sleeve member 82 continues to rise as the contact edges 91, 93 slide across each other until the tip of the first finger moves past the tip of the second finger. Thus, gravity, or the weight of the relatively upper section and the lower sleeve member 82, tends to resist rotation of the lower sleeve member in a first rotational direction 96 (towards the left in the drawings) that would tend to cause the lower sleeve member to raise and move out of the fully engaged position. Substantially conversely, gravity, or the weight, tends to rotate the lower sleeve member 82 in a second rotational direction 98 (towards the right in the drawings) and towards the fully engaged position. Once the tips 100 of the first 90 and second 92 fingers move past each other, the lower sleeve member 82 is able to move relatively freely downwardly (with the relatively upper segment) with respect to the upper sleeve member 84 to thereby telescope the relatively upper segment further into an interior of the relatively lower segment.

The lower sleeve member 82 has a peak 102 and the upper sleeve member has a peak 104. Contact between the peaks 102, 104 tends to cause the lower sleeve member 82 to rotate in either the first 96 or second 98 rotational direction and guide the lower sleeve member toward proper positioning when the lower sleeve member 82 is raised and brought into contact with the upper sleeve member 84 (such as by the user lifting on the relatively upper segment which is connected to the lower sleeve member 82). In embodiments in which the lower 82 and upper 84 sleeve members includes two or more tabs 86, the peak 102 of the lower sleeve member 82 is guided toward one of the throats located between the tabs.

In some embodiments, the sleeve members 82, 84 may be formed of two or more different materials, with a first, relatively higher strength material forming a portion 106 of the sleeve member including the engagement portion or portions of the sleeve members, and a second, relatively lower strength material forming a portion 108 of the remainder of the sleeve member. The first material may be a material with a relatively more wear resistant than the second material. The second material may be a material with relatively lower friction characteristics than the first material. The portion 106 may form a part of the edges 87, 89 of the sleeve members and may also form a part of the contact edges 91, 93.

Optionally, a recess 110 may be formed on at least one of the perimeter walls of the lower sleeve member 82 and the perimeter wall of the upper sleeve member 84. The recess 110 may be positioned adjacent to the finger 90, 92 of the respective sleeve member for receiving a portion of the finger of the other sleeve member when the sleeve members are in engaged with each other. In various embodiments, the recess 110 may be located adjacent to, and may be positioned at one end of, the respective contact edge of the sleeve member so that movement of the fingers 90, 92 along the contact edges brings the tip of each finger into the recess of the opposite finger. The recess 110 thus resists vertical movement of the lower sleeve member 82 with respect to the upper sleeve member 94 until the finger or fingers have been at least partially removed from the recess in the other sleeve member, such as by, for example, some degree of rotation of the sleeve members with respect to each other.

As a further option, an indentation 112 may be provided on either one or both of the sleeve members 82, 84. The indentation 112 may be located substantially opposite of the mouth 114 provided by the extension of the finger. The indentation 112 provides a degree of protection against accidental dislodgement of the engagement of the sleeve members if a sudden lifting force is applied to the lower sleeve member, such as by wind lifting a flag that is connected to relatively upper segments of the pole. Illustratively, an upward force applied to the lower sleeve member 108 may cause a small amount of rotation of the sleeve members with respect to each other, and allow the fingers 90 and 92 to withdraw from the mouth 114. The peak 102, 104 will tend to move toward, and may move into, the indentation 112 in the other sleeve member, and the indentation may catch the peak and resist further rotation of the sleeve members with respect to each other until the upward force is released. Upon the upward force being released, and the lower sleeve member moving downward, the tips 100 of the fingers will tend to guide the fingers back toward the engaged relationship.

In various embodiments, the mouth 90 may be generally elongated (see FIG. 8) or may be substantially V-shaped (see FIG. 10), although these shapes are not critical to the invention. Further, in various embodiments the first finger 90 and the second finger 92 may be substantially identical in shape, although this similarity is not required.

With the embodiments of the invention, rotation of one of the sleeve members (such as the lower sleeve member 82) with respect to the other one of the sleeve members (such as the upper sleeve member 84) in the first rotational direction 96 tends to disengage the lower sleeve member from the upper sleeve member without the user having to lift the lower sleeve member with respect to the upper sleeve member. The shaping of the tab 86 and slot 88, and the fingers 90 and 92, tends to raise or force the lower sleeve member in an upward direction without the user having to lift the lower sleeve member or the relatively upper segment to which the lower sleeve member is attached. Rotation of one sleeve member (such as the lower sleeve member) with respect to the other sleeve member (such as the upper sleeve member) in the second rotational direction 98 tends to engage the lower sleeve member with the upper sleeve member. Disengagement of the lower sleeve member 82 from the upper sleeve member 84 may require substantially simultaneous rotational movement and upward movement of the lower sleeve member with respect to the upper sleeve member.

It should be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A telescopic flag pole assembly comprising:
   a bottom segment, at least one intermediate segment, and a top segment, each of the segments comprising an elongate substantially cylindrical tube of a size to fit telescopically within the next adjacent lower tube;
   a sleeve assembly to facilitate telescopic movement of adjacent tubes with respect to each other, the sleeve assembly being positioned between an associated pairing of a relatively lower segment and a relatively higher segment; and
   wherein the sleeve assembly comprises:
      an upper sleeve member positioned adjacent to a top edge of the relatively lower one of the segments, the upper sleeve member including a perimeter wall; and
      a lower sleeve member positioned adjacent to a lower edge of the relatively higher one of the segments, the lower sleeve member including a perimeter wall;
      wherein the upper sleeve member and the lower sleeve member are configured to selectively engage each other such that the lower sleeve member is capable of being maintained in a static position relative to the upper sleeve member, a locking slot being defined on the upper sleeve member at position in a lower portion of the perimeter wall of the upper sleeve member, a locking tab being defined on the lower sleeve member and extending from an upper portion of the perimeter wall of the lower sleeve member, the lower sleeve member having a central longitudinal axis, a reference plane extending perpendicular to the central longitudinal axis;
      wherein the locking slot is defined by a slot edge of the perimeter wall of the upper sleeve member, the slot edge being inclined with respect to the reference plane, and wherein the locking tab is defined by a tab edge of the perimeter wall, the tab edge being inclined with respect to the reference plane such that rotating the upper sleeve member with respect to the lower sleeve member in a first direction engages the locking tab into the locking slot and rotating the upper sleeve member with respect to the lower sleeve member in a second direction disengages the locking tab from the locking slot.

2. The assembly of claim 1 wherein the upper sleeve member includes a lip portion on the perimeter wall and abutting the top edge of the relatively lower segment to restrict movement of the top edge of the relatively lower segment through the upper sleeve member.

3. The assembly of claim 1 wherein the lower sleeve member includes a lower stop portion abutting the lower edge of the relatively higher one of the segments to restrict movement of the lower edge of the relatively higher segment through the lower sleeve member.

4. The assembly of claim 1 wherein the upper sleeve member includes a lip portion on the perimeter wall and abutting the top edge of the relatively lower segment to restrict movement of the top edge of the relatively lower segment through the upper sleeve member; and
   wherein the lower sleeve member includes a lower stop portion abutting the lower edge of the relatively higher one of the segments to restrict movement of the lower edge of the relatively higher segment through the lower sleeve member.

5. The assembly of claim 1 wherein the slot edge is at least partially curved.

6. The assembly of claim 1 wherein the tab edge is curved.

7. The assembly of claim 1 additionally comprising at least one biasing means for biasing at least one of the segments toward an extended position with respect to another one of the segments.

8. The assembly of claim 1 wherein the locking tab includes a finger, and the locking slot defines a mouth for receiving the finger, and rotation of the sleeve members with respect to each other tends to remove the finger from the mouth.

9. The assembly of claim 8 wherein a recess is formed on the locking slot for receiving a tip of the finger when the finger is inserted into the mouth.

10. The assembly of claim 1 wherein the perimeter wall of the lower sleeve member includes a finger and the perimeter wall of the upper sleeve member includes a finger, the fingers of the lower and upper sleeve member being configured to releasably interlock.

11. The assembly of claim 1 wherein the upper sleeve member is formed of at least two different materials including a first material and a second material, the first material being relatively more wear resistant than the second material, the second material exhibiting relatively lower surface friction than the first material.

12. The assembly of claim 11 wherein a least a portion of the upper sleeve member that defines the locking slot is formed of the first material and a remainder portion of the upper sleeve member is formed of the second material; and
   wherein at least a portion of the lower sleeve member that defines the locking tab is formed of the first material.

13. A telescopic flag pole assembly comprising:
   a bottom segment, at least one intermediate segment, and a top segment, each of the segments comprising an elongate substantially cylindrical tube of a size to fit telescopically within the next adjacent lower tube;
   a sleeve assembly to facilitate telescopic movement of adjacent tubes with respect to each other, the sleeve assembly being positioned between an associated pairing of a relatively lower segment and a relatively higher segment; and
   wherein the sleeve assembly comprises:
      an upper sleeve member connected to the relatively lower one of the segments to move with the relatively lower segment, the upper sleeve member including a perimeter wall; and a lower sleeve member connected to of the relatively higher one of the segments to move with the relatively upper segment, the lower sleeve member including a perimeter wall;

wherein the upper sleeve member and the lower sleeve member are configured to selectively engage each other such that the lower sleeve member is maintained in a static position relative to the upper sleeve member in an extended condition; and wherein rotation of a first one of the sleeve members with respect to a second one of the sleeve members in a first rotational direction disengages the lower sleeve member from the upper sleeve member without a user having to lift the lower sleeve member with respect to the upper sleeve member.

14. The assembly of claim 13 wherein rotation of the first sleeve member with respect to the second sleeve member in a second rotational direction tends to engage the lower sleeve member with the upper sleeve member.

15. The assembly of claim 13 wherein rotation of the first sleeve member with respect to the second sleeve member in the first rotational direction tends to raise the lower sleeve member with respect to the upper sleeve member.

16. The assembly of claim 13 wherein gravity acting on the lower sleeve member tends to move the lower sleeve member into an engaged condition with the upper sleeve member.

17. The assembly of claim 13 wherein disengagement of the lower sleeve member from the upper sleeve member requires substantially simultaneous rotational movement and upward movement of the lower sleeve member with respect to the upper sleeve member.

18. A telescopic flag pole assembly comprising:
a bottom segment, at least one intermediate segment, and a top segment, each of the segments comprising an elongate substantially cylindrical tube of a size to fit telescopically within the next adjacent lower tube;
a sleeve assembly to facilitate telescopic movement of adjacent tubes with respect to each other, the sleeve assembly being positioned between an associated pairing of a relatively lower segment and a relatively higher segment; and
wherein the sleeve assembly comprises:
an upper sleeve member connected to the relatively lower one of the segments to move with the relatively lower segment, the upper sleeve member including a perimeter wall; and
a lower sleeve member connected to of the relatively higher one of the segments to move with the relatively upper segment, the lower sleeve member including a perimeter wall;
wherein the upper sleeve member and the lower sleeve member are configured to selectively engage each other such that the lower sleeve member is maintained in a static position relative to the upper sleeve member in an extended condition; and
wherein rotation of a first one of the sleeve members with respect to a second one of the sleeve members in a first rotational direction tends to raise the lower sleeve member with respect to the upper sleeve member and disengage the lower sleeve member from the upper sleeve member.

19. The assembly of claim 18 wherein rotation of the first sleeve member with respect to the second sleeve member in a second rotational direction tends to engage the lower sleeve member from the upper sleeve member.

20. The assembly of claim 18 wherein gravity acting on the lower sleeve member tends to move the lower sleeve member into an engaged condition with the upper sleeve member.

21. The assembly of claim 18 wherein disengagement of the lower sleeve member from the upper sleeve member requires substantially simultaneous rotational movement and upward movement of the lower sleeve member with respect to the upper sleeve member.

* * * * *